2,796,270

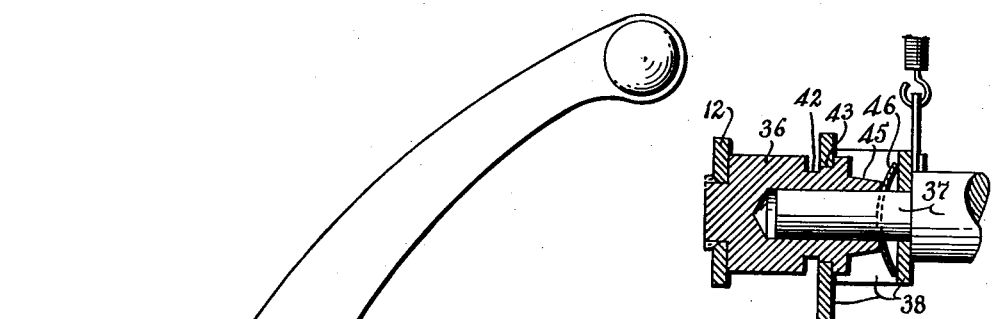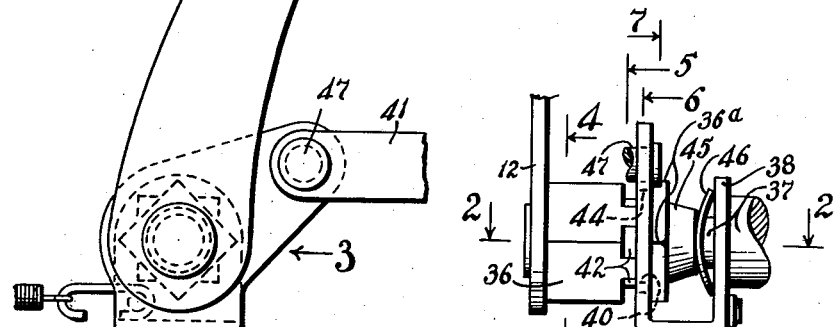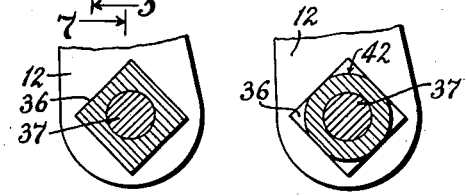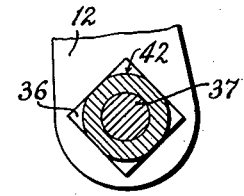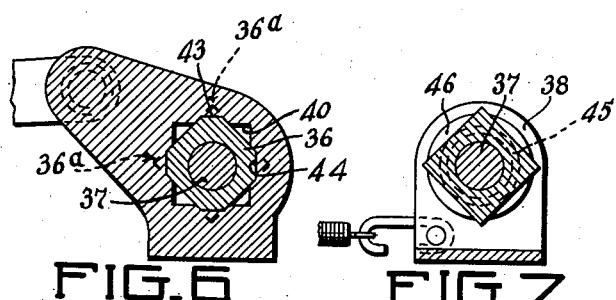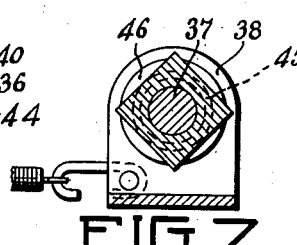

HANDLE CONNECTION

Richard E. Busch, North Hollywood, and Milton V. Scozzafava, Temple City, Calif., assignors to Clary Corporation, a corporation of California Original application February 2, 1953, Serial No. 334,632, now Patent No. 2,744,682, dated May 8, 1956. Divided and this application July 12, 1954, Serial No. 442,552

7 Claims. (Cl. 287—53)

This invention relates to calculating machines and the like operable by hand through the medium of a handle or lever.

In such a machine, the handle generally protrudes to one side of the machine to facilitate manual operation.

When transporting or shipping hand operated machines of the above type it is desirable to remove the handle to permit more compact packing and to prevent the handle from catching on other objects, or being broken or bent.

Heretofore, screws have been generally used to removably attach a handle to a part, such as a machine drive shaft, operated thereby. Although such means of attachment have proved adequate, screws are often bothersome to apply and remove. Also since the screws are separate elements, they are often lost or misplaced.

It therefore becomes the principal object of this invention to facilitate removal and replacement of a manually operable handle for a hand operated calculating machine or the like.

Another object is to eliminate the necessity of using a screw for attaching a removable handle to a part operated thereby.

Another object is to reduce the amount of time and effort necessary to remove or replace a handle for a handle operated mechanism.

Another object is to remove from view the means for attaching a handle to a part operated therefrom.

The manner in which the above and other objects of the invention are accomplished will be readily understood in reference to the following specification when read in conjunction with the accompanying drawing, wherein:

Fig. 1 is a front view of the drive handle and its connection to a handle operated part, embodying a preferred form of the present invention.

Fig. 2 is a sectional plan view of the handle and its coupling, and is taken along line 2—2 of Fig. 3.

Fig. 3 is a side view of the handle and coupling, and is taken in the direction of the arrow 3 of Fig. 1.

Figs. 4, 5, 6, and 7 are transverse sectional views taken in different planes along the length of the operating handle and the coupling connection, and are taken along the lines 4—4, 5—5, 6—6, and 7—7, respectively, of Fig. 3.

This invention is a division of the co-pending patent application of Richard E. Busch et al., Serial No. 334,632, filed on February 2, 1953, and since matured into Patent No. 2,744,682, issued on May 8, 1956. Accordingly, reference is hereby made to said co-pending application for a complete disclosure of a calculating machine in which the present invention is embodied.

Referring to the drawing, a handle generally indicated at 12, is shown as being operable by hand for the purpose of reciprocating a link partly shown at 41. Although the handle is particularly intended for operating a calculating machine in which the link 41 becomes the prime mover, it will be readily understood that the handle could be equally well applied to other forms of hand or lever operated machines. Also, although the handle is intended to be oscillated, is equally well applicable to constructions wherein the same is completely rotatable in either direction.

As shown, the handle is securely riveted or otherwise attached to a hub 36 having a generally square cross-section. The hub is rotatably mounted on the reduced shank portion of a stationary pin 37 which, for example, may be suitably and integrally attached to the frame (not shown) of the machine.

The hub 36 has an operative connection to a bail 38, one leg of which is rotatably mounted on the inner end of the shank portion of the pin 37. The other leg of the bail has a generally polygonal opening 40 arranged to interlock with a portion of the hub 36 and thus form a driving connection to the link 41 which is pivotally connected to the bail by a pin 47.

For the purpose of removably attaching the handle 12 and for resetting the same in different angular relationships relative to the machine, if so desired, the hub has its outer periphery formed to provide a circular groove 42 (Figs. 3 and 5). The bottom of this groove extends tangentially to the flat faces of the hub.

Directly to the right (Fig. 3) of the groove 42 and contiguous therewith, the corners of the hub are removed a short distance as indicated in Figs. 2, 3, and 6 to form, in effect, a second groove. The resulting truncated corners 43 resulting from the removal of said corners are adapted to directly fit matching truncated corners 44 in the generally polygonal opening 40 of the bail 28.

The inner end of the handle hub 36 is cone-shaped as indicated at 45 to facilitate entry of the hub in the opening 40 when attaching the handle in place. This end of the hub abuts a curved, ring-type washer 46 of spring material resting against the inner leg of the bail 38.

Should it be desired to remove the handle, the latter is pressed inwardly, collapsing the spring 46 until the groove 42 is aligned with the opening 40 in the left hand leg (Fig. 3) of the bail 38. In this condition, the handle may be rotated 45° in either direction relative to the bail so as to align the corners 36a comprising a head of the hub 36 with the similar corners of the polygonal opening 40 in the bail 38. In this condition, the handle may be withdrawn outwardly and removed from the pin 37.

When replacing the handle, the corners 36a of the hub 36 are aligned with the sharp corners (comprising first portions) of the polygonal opening 40. The handle is pressed inwardly over the pin 37, collapsing the spring 46 until the groove 42 is aligned with the left hand leg of the bail. The handle is then rotated 45° in one direction or the other until the parts are aligned in their relative positions shown in Fig. 6 wherein the truncated corners 44 (comprising second portions) of the opening fit the truncated corners 43 of the hub. The spring 46 is then allowed to snap the handle outwardly (to the left in Figs. 2 and 3) to lock the parts in position.

It will be noted that the handle may be adjusted to any of four positions relative to the bail and, accordingly, relative to the machine to which it is attached. This feature is of particular advantage in servicing and testing a calculating machine or the like in that the machine may be supported in different positions, for example, upside down, and yet the handle may be mounted for convenient operation in such a position.

Although we have described our invention in detail and have therefore used certain terms and languages herein, it is to be understood that the present invention is illustrative rather than descriptive, and that changes and modifications may be made without departing from the spirit or scope of the invention as set forth in the claims appended hereto.

Having thus described the invention, what we desire to secure by United States Letters Patents is:

1. In a hand driven machine, the combination with a rotatable drive element and a detachable handle for said element, a hub on said handle and extending from one side of said handle, said hub having three contiguous sections of different cross-sectional configurations spaced axially therealong, said drive element having an opening therein of a shape to fit over each of said sections, only the said section nearest said handle permitting relative rotation between said handle and said drive element, said opening having a shape such as to slidably fit over an intermediate one of said sections upon rotation of said hub through a predetermined angle relative to said drive element and to seat against the third one of said sections, and spring means for normally maintaining said hub in engagement with said second section.

2. In a hand driven machine, the combination with a rotatable drive element and a detachable handle for said element, of means for rotatably supporting said drive element, a hub on said handle, said hub having a head thereon, said head having a polygonal cross sectional shape, a peripheral groove in said hub intermediate said head and said handle, a portion of said head adjacent said groove having the corners thereof truncated, said drive element having an opening therein of polygonal shape, said opening having first portions arranged to slidably fit over said head and second portions arranged to slidably fit over said truncated portion of said head, whereby said head may be inserted in said first portions of said opening until said peripheral groove is aligned with said opening and then turned a predetermined amount to slidably fit said truncated portion of said head in said second portions of the opening, whereupon the corners of said head prevent detachment of said handle outwardly from said drive element.

3. In a hand driven machine, the combination with a rotatable drive element and a detachable handle for said element, of means for rotatably supporting said drive element, a hub on said handle, said hub having a head thereon, said head having an equilateral polygonal cross sectional shape, a peripheral groove in said hub intermediate said head and said handle, a drive portion of said head adjacent said groove having a non-circular cross sectional shape relative to the axis of rotation of said handle, said drive element having an opening therein of polygonal shape, said opening having first portions arranged to slidably fit over said head and second portions arranged to slidably fit over said drive portion of said head, whereby said head may be inserted in said first portions of said opening until said peripheral groove is aligned with said opening and then turned a predetermined amount to slidably fit said drive portion of said hub in said second portions of said opening, whereupon the corners of said head prevent detachment of said handle outwardly from said drive element.

4. In a hand driven machine, the ombination with a rotatable drive element and a detachable handle for said element, means comprising a bearing shaft for rotatably supporting said drive element and said handle, a hub on said handle, said hub having a head thereon of equilateral polygonal cross sectional shape and an axial bearing hole therein arranged to be journaled on said shaft, a peripheral groove in said hub intermediate said head and said handle, a portion of said hub intermediate said head and said groove having a non-circular cross sectional shape, said drive element having an opening therein of polygonal shape, said opening having first poritons arranged to slideably fit over said head upon fitting said hub over said shaft and second portions arranged to slideably fit over said intermediate portion of said hub, whereby said head may be inserted into said first portions of said opening until said peripheral groove is aligned with said opening and then turned a predetermined amount to slideably fit said intermediate portion of said hub in said second portions of said opening, whereupon the corners of said head prevent detachment of said handle outwardly from said drive element.

5. The combination according to claim 3 comprising a spring for urging said hub axially whereby to maintain said corners of said head against said drive element.

6. In a hand driven machine, the combination with a rotatable drive bail and a detachable handle for said bail, of a bearing shaft for rotatably supporting said handle and said bail, a bearing hole in one leg of said bail journaled on said shaft, a hub on said handle, said hub having a head thereon of equilateral polygonal cross sectional shape and an axial bearing hole therein adapted to be journaled on said shaft pin, a peripheral groove in said hub intermediate said head and said handle, a portion of said hub intermediate said head and said groove having a non-circular cross sectional shape, an opening in the other leg of said bail of polygonal shape, said opening having first portions arranged to slideably fit over said head upon fitting said hub over said shaft and second portions arranged to slideably fit over said intermediate portion of said hub, whereby said head may be inserted in said opening until said peripheral groove is aligned with said opening and then turned a predetermined amount to slideably fit said intermediate portion of said hub in said second portions of said opening whereupon the corners of said head prevent detachment of said handle outwardly from said drive bail.

7. The combination according to claim 6 comprising a compression spring surrounding said shaft intermediate said first mentioned leg of said bail and said hub for urging said hub axially along said shaft whereby to maintain the corners of said head against said other leg of said bail.

References Cited in the file of this patent

UNITED STATES PATENTS

| | | |
|---|---|---|
| 1,166,345 | Gates | Dec. 28, 1915 |
| 2,139,374 | Michel | Dec. 6, 1938 |
| 2,232,997 | Caldwell | Feb. 25, 1941 |
| 2,280,304 | Schauer | Apr. 21, 1942 |
| 2,429,190 | McArthur | Oct. 14, 1947 |
| 2,501,008 | Schramm | Mar. 21, 1950 |